UNITED STATES PATENT OFFICE.

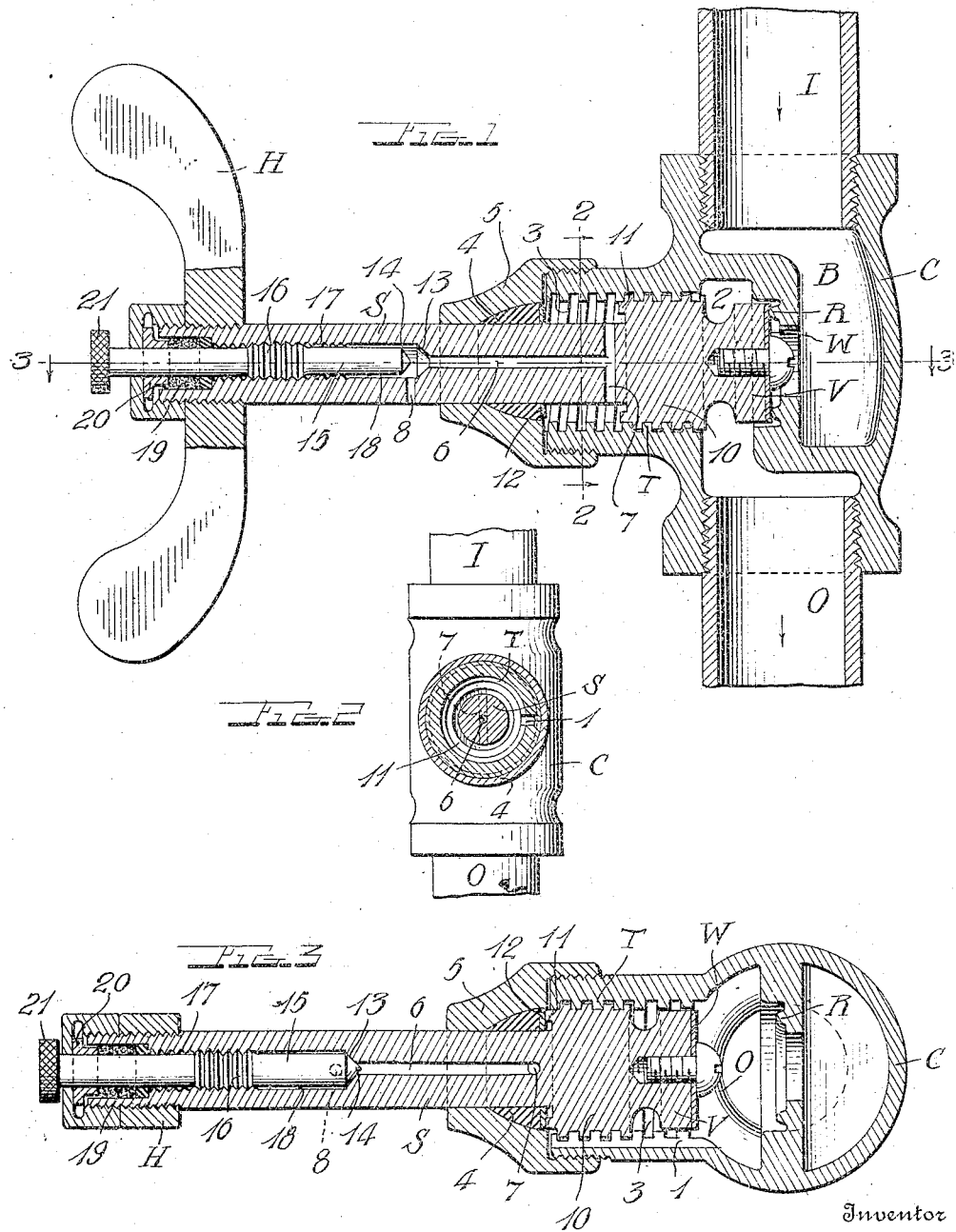
G. H. AUGHENBAUGH.
COMPRESSION STOP AND WASTE COCK.
APPLICATION FILED DEC. 19, 1912.
1,099,418. Patented June 9, 1914.

GEORGE HENRY AUGHENBAUGH, OF YORK, PENNSYLVANIA.

COMPRESSION STOP AND WASTE COCK.

1,099,418.  Specification of Letters Patent.  Patented June 9, 1914.

Application filed December 19, 1912. Serial No. 737,694.

*To all whom it may concern:*

Be it known that I, GEORGE H. AUGHENBAUGH, a citizen of the United States, residing at York, in the county of York and State of Pennsylvania, have invented certain new and useful Improvements in Compression Stop and Waste Cocks; and I do declare the following to be a full, clear, and exact description of the invention, such as will enable others skilled in the art to which it appertains to make and use the same.

This invention relates to water distribution, and more especially to cocks and faucets or valves; and the object of the same is to produce an improved device of this character which can be used as a compression stop and waste cock or simply as a compression cock at will. This object is carried out by providing the valve stem with a waste vent and a needle valve for closing it when desired, and by constructing the entire device in the manner hereinafter more fully described and claimed and as shown in the drawings wherein—

Figure 1 is a central vertical sectional view through this device with the main valve closed and the waste valve opened. Fig. 2 is a cross section on the line 2—2 of Fig. 1. Fig. 3 is a transverse section on the line 3—3 of Fig. 1 with the main valve open and the waste valve closed.

In the drawings is shown an embodiment of this device when used as a valve whose casing C forms communication between the inlet pipe I and the outlet pipe O, although it will be clear that the pipe I shown herein could be the inner or threaded end of a spigot and the pipe O its outlet end or nozzle without departing from the spirit of the invention. Said casing contains a bridge B carrying a seat for the main valve V which travels to and from its seat on threads T within the casing and around the valve, and is moved by means of a stem S having a handle H at its outer end as usual. No novelty is claimed for the features thus far described, nor on the washer W on the end of the main valve which seats against a ridge R around the opening through the bridge B when this valve is closed, as this form of compression cock is well known to the trade.

Coming now more particularly to the details of the present invention, the threads T are by preference mutilated as seen at 1 in Figs. 2 and 3 so as to permit the fluid passing through the valve casing and entering the space 2 behind the main valve V when the latter is open, to flow through said mutilations 1 into the space 3 behind the threaded portion of this valve, whence it can not escape because of the packing 4 and gland nut 5 which are employed as usual and fit closely around the stem S. But said stem in the present instance is made tubular, its fine or small longitudinal bore 6 communicating with a cross port 7 near its juncture with the head 10 of the main valve V, and leading thence outward to the exterior side of the packing 4 and the gland nut 5 to a lateral outlet port 8; and when the valve stands slightly open or when the main valve V is at all raised from its seat R the fluid within the space 2 (if under pressure) may pass through the mutilations 1, into the cross port 7, along the bore 6, and out the outlet port 8. On the other hand, when the main valve V is screwed home so that it closes against its seat R, none of the fluid in the pipe I on the inlet side of the casing C can escape through the outlet port 8, but the fluid in the pipe O if subjected to back pressure may set back through the space 2 and along the course outlined and run out the outlet port 8. The device thus becomes a compression stop and waste.

At the back of the main valve head 10 is formed an annular ridge 11 capable of being seated against a washer 12 which rests against the inner end of the packing 4, and when the stem is unscrewed so that the main valve is drawn outward to the extent shown in Fig. 3, the space 3 which normally communicates with the cross port 7 is thus closed and no waste will escape from the interior of the casing or from either pipe I or O.

A means for converting this device into an ordinary cock is to close the bore 6. This by preference I accomplish in the following manner: At the juncture of said bore with the outlet port 8, the former is enlarged so as to produce a valve seat 13, and adapted to close against the same is the conical or needle end 14 of a supplemental or waste valve whose stem 15 in the present instance has threads 16 engaging female threads 17 within the enlarged portion 18 of the bore 6 as shown, the outer end of said stem passing through a packing 19 and a suitable gland nut 20 and having a knurled head 21 at its extremity as shown. When now this head is turned in a proper direction to retract the stem 15 and withdraw the valve 14 from the seat 13, the waste passage is open as seen in Fig. 1; but when the head is turned in the other direction and the stem forced inward, the valve 14 closes against the seat as seen in Fig. 3 and therefore no waste passing through the bore 6 can escape.

I do not wish to be limited to the precise construction of the supplemental valve herein shown, but find that such is a convenient arrangement because the knurled head 21 stands at the center of the handle H and is readily accessible to the operator. Otherwise also the parts of this device may be modified in construction to a considerable extent without departing from the principle of the invention, and obviously their proportions and materials are not essential.

What is claimed as new is:

In a compression stop and waste cock, the combination with the main valve casing provided with internal mutilated threads and having a bridge pierced with an opening surrounded by a valve seat, a gland nut and packing at the outer end of said casing, and the main valve including a threaded head screwed into the casing between said packing and seat and a tubular stem, the bore of the latter being enlarged from about midway of its length to its outer end and threaded within the enlarged portion and the wall of the bore having two radial ports, said packing surrounding the stem between such ports; of a needle valve within the enlarged outer portion of such bore and externally threaded to engage the threads therein, its inner end being shaped to fit the seat formed by the enlargement of such bore and its outer end projecting beyond the stem and having a head and a gland nut and packing at the outer end of the tubular stem through which said needle valve projects, for the purpose set forth.

In testimony whereof I have hereunto set my hand in presence of two subscribing witnesses.

GEORGE HENRY AUGHENBAUGH.

Witnesses:
  ROBERT HENRY,
  JOHN M. WEIGLE.